(12) United States Patent
Choi et al.

(10) Patent No.: US 9,349,074 B2
(45) Date of Patent: May 24, 2016

(54) METHOD AND APPARATUS FOR GENERATING 3D KNEE JOINT IMAGE

(71) Applicant: GWANGJU INSTITUTE OF SCIENCE AND TECHNOLOGY, Gwangju (KR)

(72) Inventors: Tae Sun Choi, Gwangju (KR); Wook-Jin Choi, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 14/142,388

(22) Filed: Dec. 27, 2013

(65) Prior Publication Data

US 2015/0117728 A1 Apr. 30, 2015

(30) Foreign Application Priority Data

Oct. 25, 2013 (KR) .......................... 10-2013-0127923

(51) Int. Cl.
*G06K 9/00* (2006.01)
*G06K 9/62* (2006.01)
*G06T 7/00* (2006.01)

(52) U.S. Cl.
CPC ............ *G06K 9/6201* (2013.01); *G06T 7/0083* (2013.01); *G06T 7/0089* (2013.01); *G06T 2207/10088* (2013.01); *G06T 2207/20124* (2013.01); *G06T 2207/30008* (2013.01)

(58) Field of Classification Search
None
See application file for complete search history.

(56) References Cited

U.S. PATENT DOCUMENTS

| | | | | |
|---|---|---|---|---|
| 7,799,077 B2 * | 9/2010 | Lang | ................... | A61F 2/30756 264/DIG. 30 |
| 8,280,126 B2 * | 10/2012 | Dam | ...................... | A61B 5/055 382/128 |
| 8,571,278 B2 * | 10/2013 | Sonka | .................. | G06K 9/4638 382/128 |
| 8,884,618 B2 * | 11/2014 | Mahfouz | ............... | A61F 2/3094 324/309 |
| 2004/0167390 A1 * | 8/2004 | Alexander | ............. | A61B 5/055 600/410 |

(Continued)

FOREIGN PATENT DOCUMENTS

JP       2010213899 A    9/2010
KR   1020110018768 A    2/2011

(Continued)

OTHER PUBLICATIONS

Model-based Auto-Segmentation of Knee Bones and Cartilage in MRI Data, Heiko Seim et al, http://www.ski10.org/data/2010-11-09-1131.pdf. , pp. 1-22.*

(Continued)

*Primary Examiner* — Jayesh A Patel
(74) *Attorney, Agent, or Firm* — Hauptman Ham, LLP

(57) ABSTRACT

Disclosed herein are a method and an apparatus for generating a 3D knee joint image. According to an exemplary embodiment of the present invention, a method for generating a 3D knee joint image includes: generating a statistical shape model by using previously generated sample knee bone images; generating a knee joint bone image by segmenting a bone region from an input knee image using the statistical shape model; generating a keen joint cartilage image by segmenting a cartilage region from the knee joint bone image; and generating a 3D knee joint image for the input knee image by composing the knee joint bone image with the knee joint cartilage image. According to the exemplary embodiments of the present invention, it is possible to more rapidly and accurately generate the 3D knee joint image.

5 Claims, 12 Drawing Sheets

(56) References Cited

U.S. PATENT DOCUMENTS

| | | | | |
|---|---|---|---|---|
| 2007/0058865 A1* | 3/2007 | Li | ................ | G06K 9/4638 382/173 |
| 2009/0136103 A1* | 5/2009 | Sonka | ................ | G06K 9/4638 382/128 |
| 2009/0190815 A1* | 7/2009 | Dam | ................ | A61B 5/055 382/131 |
| 2009/0306496 A1* | 12/2009 | Koo | ................ | A61B 5/055 600/417 |
| 2011/0282473 A1* | 11/2011 | Pavlovskaia | ................ | A61B 19/50 700/98 |
| 2013/0336553 A1* | 12/2013 | Buisseret | ................ | G06T 7/0083 382/128 |

FOREIGN PATENT DOCUMENTS

| KR | 20120103979 A | 9/2012 |
|---|---|---|
| KR | 20130023735 A | 3/2013 |

OTHER PUBLICATIONS

A fully automated segmentation of knee bones and cartilage using shape context and active shape models, Behnaz Pirzamanbin, May 16, 2012, pp. 1-53.*

Three-dimensional reconstruction of subject-specific knee joint—Jul. 12, 2013, doi: 10.1177/0954411913493723, pp. 1083-1093.*

Model-based Auto-Segmentation of Knee Bones and Cartilage in MRI Data, Heiko Seim et al, http://www.skil0.org/data/2010-11-09-1131.pdf., pp. 1-22.*

Knee cartilage Extraction—Sets, Tamez-Pena et al., SPIE vol. 5370, 2004, pp. 1774-1784.*

Automatic segmentation—knee, Fripp et al., IOP publishing, 2007, pp. 1617-1631.*

(Supportive Materials for Exception to Loss of Novelty), Wook-Jin Choi et al., Statistical Shape Model based Three Dimensional Shape Modeling for Knee Joint on Magnetic Resonance Images, p. 461-465, Nov. 3, 2012, Korean Institute of Information Technology.

Korean Office Action dated Mar. 1, 2015, citing the above reference(s).

Korean Office Action dated Sep. 21, 2015 in connection with the counterpart Korean Patent Application No. 10-2013-0127923, citing the above reference(s).

Korean Notice of Allowance issued Jan. 27, 2016 in connection with the counterpart Korean Application No. 10-2013-0127923.

* cited by examiner (a)　　　　　(b)

(c)　　　　　(d)

METHOD AND APPARATUS FOR GENERATING 3D KNEE JOINT IMAGE

CROSS REFERENCE TO RELATED APPLICATION

This application claims the benefit of Korean Patent Application No. 10-2013-0127923, filed on Oct. 25, 2013, which is hereby incorporated by reference in its entirety into this application.

BACKGROUND OF THE INVENTION

1. Technical Field

The present invention relates to a method and an apparatus for generating a 3D knee joint image.

2. Description of the Related Art

Recently, the occurrence of arthritis has increased due to the average life extension and a total knee arthroplasty to treat arthritis has been conducted. For the successful total knee arthroplasty, it is most important to recover an ideal lower extremity alignment by accurate bone cutting.

According to the related art, a 3D knee joint model is generated by mainly using a computed tomography (CT) and a patient specific bone cutting inducing apparatus which meets the generated model has been used. However, since a cartilage portion in a knee is not accurately differentiated using the CT image, it is difficult to accurately cut a bone.

Meanwhile, a magnetic resonance image (MRI) displays various tissues, such as a bone, a cartilage, a cortical bone, fat, a ligament, a meniscus, a muscle, a tendon, and a marrow fluid. However, since some tissues which are displayed by the MRI image have a distribution of similar brightness values, it is difficult to differentiate an interface between the tissues.

Therefore, passive and semi-automated algorithms which divide the desired region of the MRI image have been proposed. However, according to the above-mentioned methods, it takes much time to extract the desired tissues from the MRI image and the extraction accuracy and the extraction range are changed depending on the user's experience and judgment.

SUMMARY OF THE INVENTION

The present invention has been made in an effort to provide a method and an apparatus for more rapidly and accurately generating a 3D knee joint image.

The foregoing and other objects, features, aspects and advantages of the present invention will be understood and become more apparent from the following detailed description of the present invention. Also, it may be easily understood that the objects and advantages of the present invention can be realized by the units and combinations thereof recited in the claims.

According to an exemplary embodiment of the present invention, there is provided a method for generating a 3D knee joint image, including: generating a statistical shape model by using previously generated sample knee bone images; generating a knee joint bone image by segmenting a bone region from an input knee image using the statistical shape model; generating a keen joint cartilage image by segmenting a cartilage region from the knee cartilage bone image; and generating a 3D knee joint image for the input knee image by composing the knee joint bone image with the knee joint cartilage image.

According to another exemplary embodiment of the present invention, there is provided an apparatus for generating a 3D knee joint image, including: a statistical model generation unit generating a statistical shape model by using previously generated sample knee bone images; a knee joint bone image generation unit generating a knee joint bone image by segmenting a bone region from an input knee image using the statistical shape model; a knee joint cartilage image generation unit generating a keen joint cartilage image by segmenting a cartilage region from the knee joint bone image; and a 3D knee joint image generation unit generating a 3D knee joint image for the input knee image by composing the knee joint bone image with the knee joint cartilage image.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
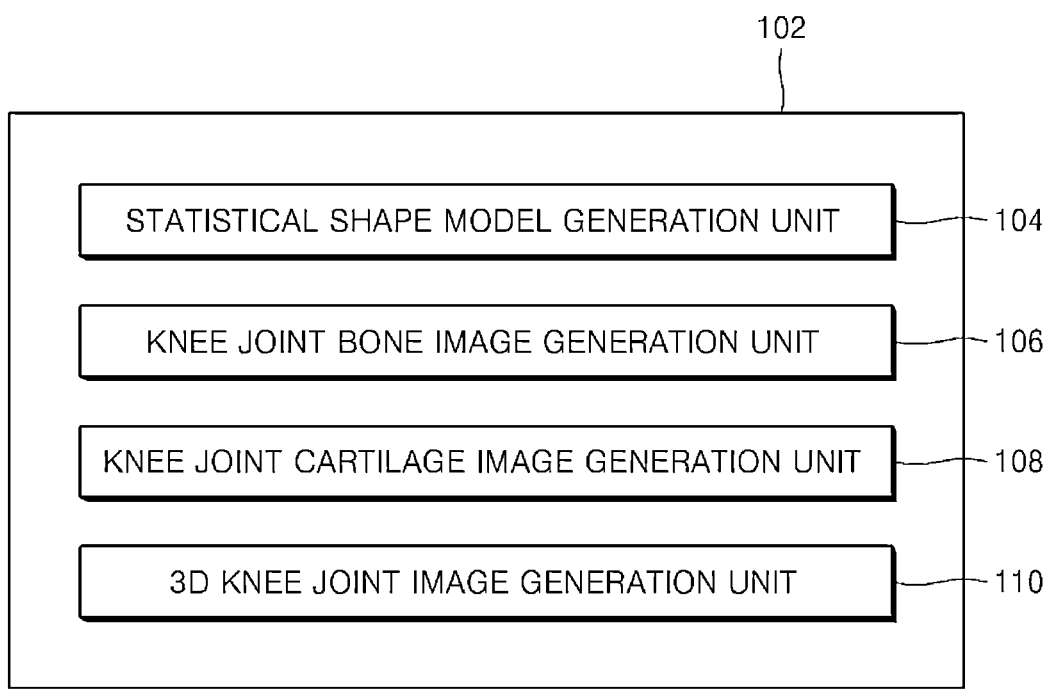
FIG. 1 is a configuration diagram of an apparatus for generating a 3D knee joint image according to an exemplary embodiment of the present invention.

The above objects, features, and advantages will be described in detail with reference to the accompanying drawings and therefore, the technical ideas of the present invention can be easily practiced by a person with ordinary skill in the art to which the present invention pertains. Further, when it is determined that the detailed description of the known art related to the present invention may obscure the gist of the present invention, the detailed description thereof will be omitted. Hereinafter, exemplary embodiments of the present invention will be described in detail with reference to the accompanying drawings. Throughout the disclosure, like reference numerals refer to like parts throughout the various figures and embodiments of the present invention.

FIG. 1 is a configuration diagram of an apparatus for generating a 3D knee joint image according to an exemplary embodiment of the present invention. An apparatus 102 for generating a 3D knee joint image according to an exemplary embodiment of the present invention receives, for example, a knee image (hereinafter, input knee image) such as an MRI image and generates a 3D knee joint image by using the input knee image.

Referring to FIG. 1, the apparatus 102 for generating a 3D knee joint image according to the exemplary embodiment of the present invention includes a statistical shape model generation unit 104, a knee joint bone image generation unit 106, a knee joint cartilage image generation unit 108, and a 3D knee joint image generation unit 110.

In this configuration, the statistical shape model generation unit 104 generates a statistical shape model by using previously generated sample knee joint images. According to the exemplary embodiment of the present invention, the statistical shape model generation unit 104 generates matching images for each of the sample knee bone images by using original images and reduction images of each of the sample knee bone images. In more detail, the statistical shape model generation unit 104 extracts feature points of the original images and feature points of the reduction images and extracts shape contexts for the feature points of the original images and shape contexts for the feature points of the reduction images. Next, the statistical shape model generation unit 104 matches the reduction images with the original images by using the shape contexts of the original images and the shape contexts of the reduction image, thereby generating the matching images.

According to the exemplary embodiment of the present invention, the statistical shape model generation unit 104 generates final matching images by using the generated matching images. In more detail, the statistical shape model generation unit 104 determines reference matching images and non-reference matching images among the generated matching images, extracts feature points of the reference matching images and feature points of the non-reference matching images, and extracts shape contexts for the feature points of the reference matching images and shape contexts for the feature points of the non-reference matching images. Next, the statistical shape model generation unit 104 matches the non-reference matching images with the reference matching images by using the shape contexts of the reference matching images and the shape contexts of the non-reference matching images, thereby generating the final matching images.

According to the exemplary embodiment of the present invention, the statistical shape model generation unit 104 extracts the feature points of the generated final matching images to generate feature point vectors for each of the sample bone knee images. Next, the statistical shape model generation unit 104 generates a statistical shape model by using an average vector and a covariance matrix of the feature point vectors.

Meanwhile, the knee joint bone image generation unit 106 segments a bone region from the input knee image by using the statistical shape model generated by the statistical shape model generation unit 104, thereby generating the knee joint bone image. In more detail, the knee joint bone image generation unit 106 disposes the statistical shape model generated by the statistical shape model generation unit 104 on the input knee image and calculates brightness value vectors of points, at which each of the feature points of the statistical shape model is positioned, in the input knee image. Next, the knee joint bone image generation unit 106 moves each of the feature points on the input knee image by using the calculated brightness value vectors and segments the bone region from the input knee image using each of the moving feature points to generate the knee joint bone image.

The knee joint cartilage image generation unit 108 segments a cartilage region from the knee joint bone image generated by the knee joint bone image generation unit 106 to generate the knee joint cartilage image. In more detail, the knee joint cartilage image generation unit 108 sets an interest region in the knee joint bone image generated by the knee joint bone image generation unit 106 and extracts a bone-cartilage interface from the set interest region. Next, the knee joint cartilage image generation unit 108 segments the cartilage region from the knee joint bone image by using the brightness value information of the extracted bone-cartilage interface, thereby generating the knee joint cartilage image.

The 3D knee cartilage image generation unit 110 combines the generated knee joint bone image with the knee joint cartilage image to generate the 3D knee joint image.

Figure 2:
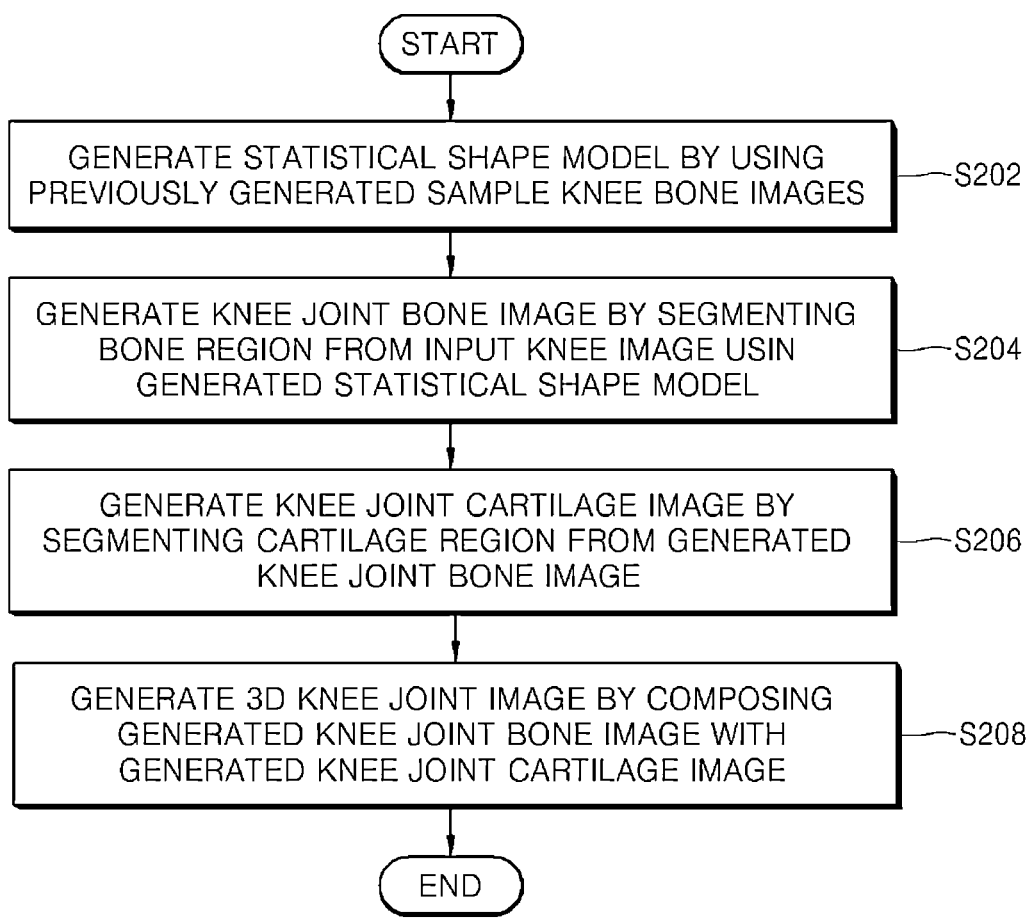
FIG. 2 is a flow chart of a method for generating a 3D knee joint image according to an exemplary embodiment of the present invention.

FIG. 2 is a flow chart of a method for generating a 3D knee joint image according to an exemplary embodiment of the present invention. Referring to FIG. 2, according to the exemplary embodiment of the present invention, the statistical shape model is generated by using the previously generated sample knee bone images (S202). Further, the knee joint bone image is generated by segmenting the bone region from the input knee image by using the generated statistical shape model (S204). Next, the knee joint cartilage image is generated by segmenting the cartilage region from the generated knee joint bone image (S206). Finally, the 3D knee joint image is generated by combining the generated knee joint bone image with the generated knee joint cartilage image (S208).

Hereinafter, each process of the method for generating a 3D knee joint image according to the exemplary embodiment of the present invention will be described in detail with reference to FIG. 2.

1. Generation of Statistical Shape Model (S202)

As described above, according to the exemplary embodiment of the present invention, the 3D knee joint image is generated by extracting the knee joint of the input knee image. In this case, the statistical shape model is used to generate the 3D knee joint image.

Figure 3:
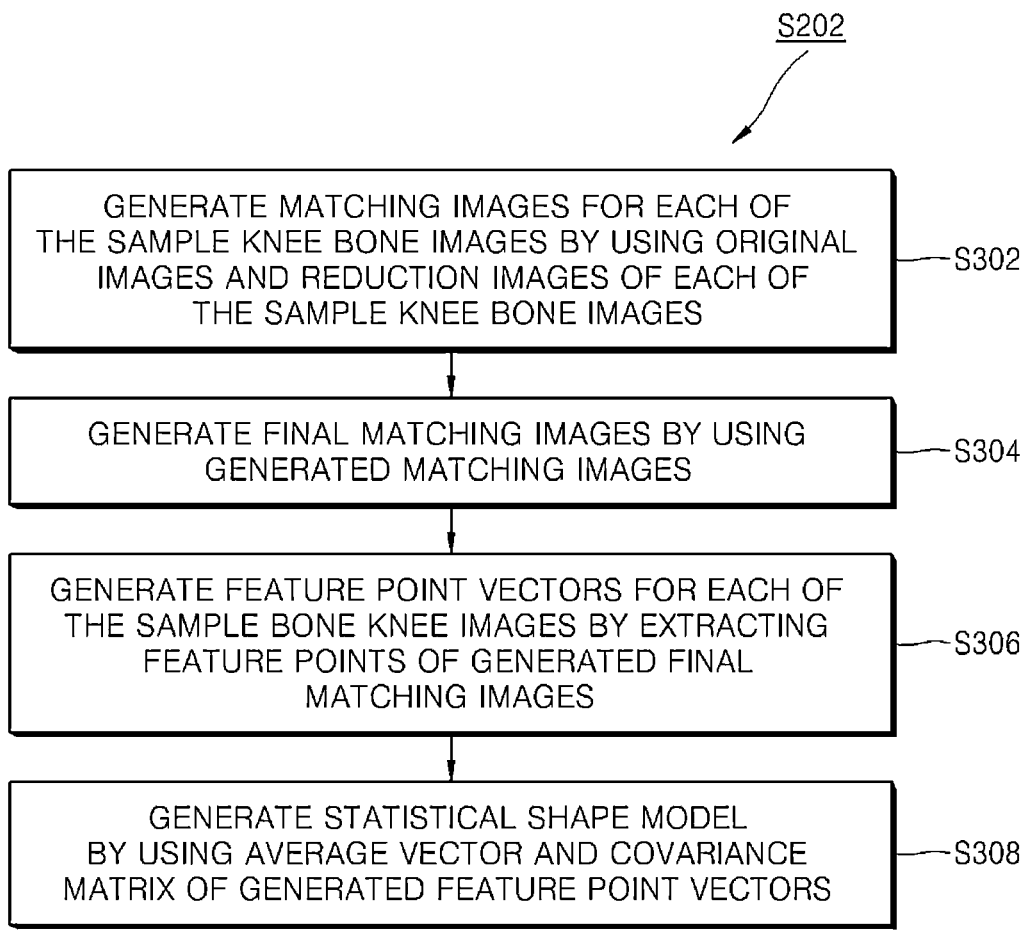
FIG. 3 is a detailed flow chart of generating a statistical shape model (S202) in the method for generating a 3D knee joint image according to an exemplary embodiment of the present invention.

FIG. 3 is a detailed flow chart of generating a statistical shape model (S202) in the method for generating a 3D knee joint image according to an exemplary embodiment of the present invention. The generating of the statistical shape model (S202) is made by being divided into several steps as illustrated in FIG. 3.

(1) Generating of Matching Images for Each of the Sample Knee Bone Images (S302)

Referring to FIG. 3, the matching images for each of the sample knee bone images are first generated by using the original images and the reduction images of each of the sample knee bone images (S302).

According to the exemplary embodiment of the present invention, a plurality of previously generated sample knee images is used to generate the statistical shape model. In the sample knee image used in the exemplary embodiment of the present invention, a bone portion (femur, tibia) and the cartilage portion (articular cartilage, meniscus cartilage, and the like) of the knee are segmented. In step S302, the bone portion, that is, the sample knee bone image among the sample knee images is used. According to the exemplary embodiment of the present invention, the statistical shape model may be generated by using, for example, 60 sample knee bone images.

Figure 4:
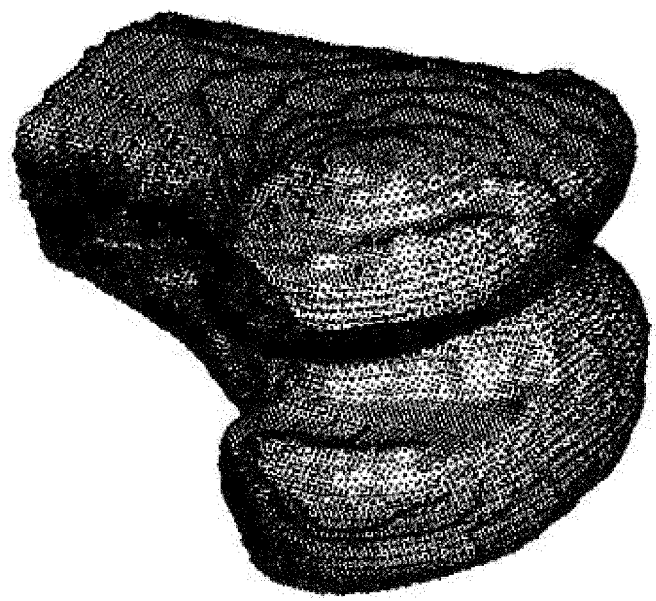
FIG. 4 is a diagram illustrating an original image of a sample knee bone image.
Figure 5:
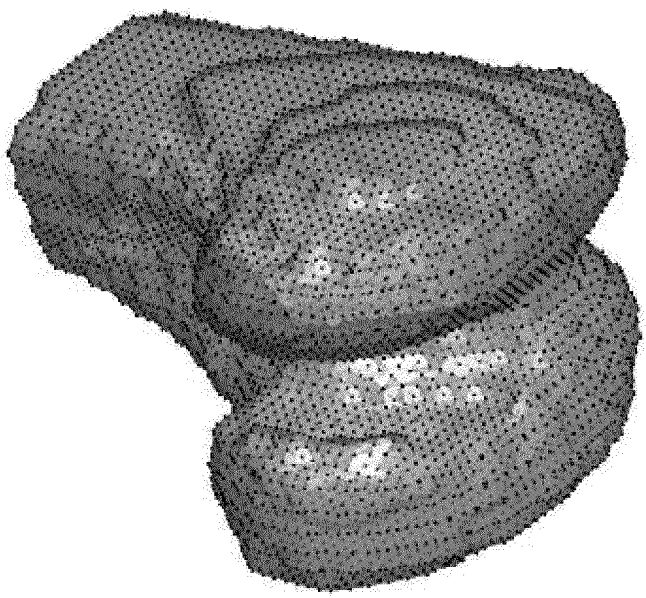
FIG. 5 is a diagram illustrating a reduction image of the sample knee bone image.

In the generation of the matching image (S302), the original images of the sample knee bone images and the reduction images of the original images are generated. The reduction image means an image in which a resolution of the original image is reduced. FIG. 4 is a diagram illustrating the original image of the sample knee bone image and FIG. 5 is a diagram illustrating the reduction image of the sample knee bone image. Next, the feature points of the original images and the reduction images are each extracted.

Herein, the feature point means a point having an anatomical meaning in the knee joint and generally exists at an outline portion of the joint. In FIGS. 4 and 5, each of the points displayed on the knee bone image is a feature point. The knee bone image may be formed of lines and faces which connect the feature points. To extract the appropriate number of feature points which may effectively represent the anatomical feature of the knee joint, the exemplary embodiment of the present invention uses surface information which is detected from the original images of the sample knee bone images and the reduction images of the original images. According to the exemplary embodiment of the present invention, the surface is detected from the bone shape of the sample knee bone image by using a Marching Tetrahedron algorithm. The detected surface is formed of vertexes configuring the surface and a partial face (configured of a triangle using three points) for configuring the overall surface using the vertexes.

The surface information detected from the original images includes a large number of feature points and include detailed anatomical information. On the other hand, in the case of the reduction image, the surface information includes a relatively smaller number of points and notable anatomical information, but has relatively reduced accuracy. For example, as illustrated in FIG. 5, the reduction images have the smaller number of feature points than those of the original images of FIG. 4 but do not accurately reflect the shapes of the original images.

Therefore, in the next process, the shape contexts for the feature points of the original images and the shape contexts for the feature points of the reduction images are extracted and the reduction images are matched with the original images by using the extracted shape contexts to optimize the feature points of the reduction image.

Herein, the shape context means a result or a method which represents each portion of the shape by using the relationship between one point and the remaining points of any shape. FIGS. 7A to 7D are diagrams for describing a method for extracting a shape context according to an exemplary embodiment of the present invention. A tetrahedral shape as illustrated in FIG. 7A has a total of four feature points as illustrated in FIG. 7B. The shape contexts for each of the four feature points may be extracted. For example, when the uppermost point of any one point (a point at the top of FIG. 7C or a point at the leftmost of FIG. 7D) as illustrated in FIG. 7C or 7D is specified, vectors for the remaining points are generated at the specified points. When the vectors are represented by histogram configured of distance and direction components, the shape contexts for each of the points may be extracted.

Figure 8:
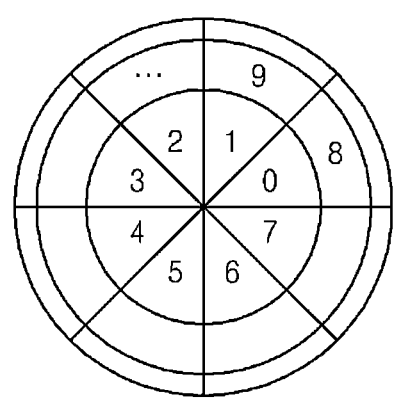
FIG. 8 is a diagram illustrating a histogram bin configuration of a shape context of a 2D image.

FIG. 8 is a diagram illustrating a histogram bin configuration of a shape context of a 2D image. It is possible to search for a point $q_j$ coinciding with all points $p_i$ of a model shape from a target shape by using the shape context. A shape context hi for the remaining n−1 points to the points $p_i$ is as the following Equation 1.

$$h_i(k) = \#\{q \neq p_i : (q-p_i) \in \text{bin}(k)\} \qquad \text{[Equation 1]}$$

In the above Equation 1, the number of bins is determined depending on one which represents a distance from the point $p_i$ by a log scale and one which represents a direction of the vectors configured of the point $p_i$ and the remaining points by a spherical coordinate system. According to the exemplary embodiment of the present invention, the distance is segmented into 7 steps and angles at the spherical coordinate system are each segmented into 10 steps, such that a total of 700 (7×10×10) bins are used.

Figure 7:
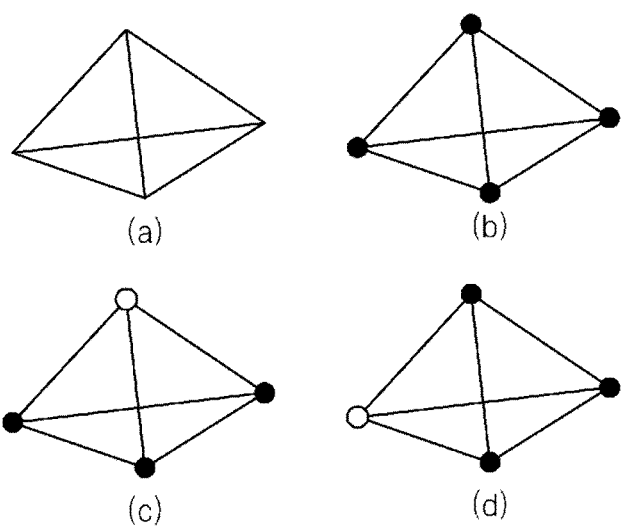
FIGS. 7A to 7D are diagrams for describing a method for extracting a shape context according to an exemplary embodiment of the present invention.

According to the exemplary embodiment of the present invention, the shape contexts for all the points of each surface are extracted, the coinciding shape context is used, and the surface of the reduction image is matched with the surface of the original image by using an iterative shape context matching method of the feature points. All the points of the matched surface are used as the feature points. In FIG. 7, the feature points (dark colored points on a surface) extracted from the reduction images (a) are matched with the feature points extracted from the original images (b) by using the iterative shape context matching method to extract the feature points on the surface of the matched image (c).

When the shape contexts for each of the feature points of the original images and the reduction images are extracted, the reduction images are matched with the original images by using the extracted shape contexts. According to the exemplary embodiment of the present invention, to match the reduction images with the original images, the iterative shape context matching method is used as follows.

Iterative Shape Context Matching

Figure 9:
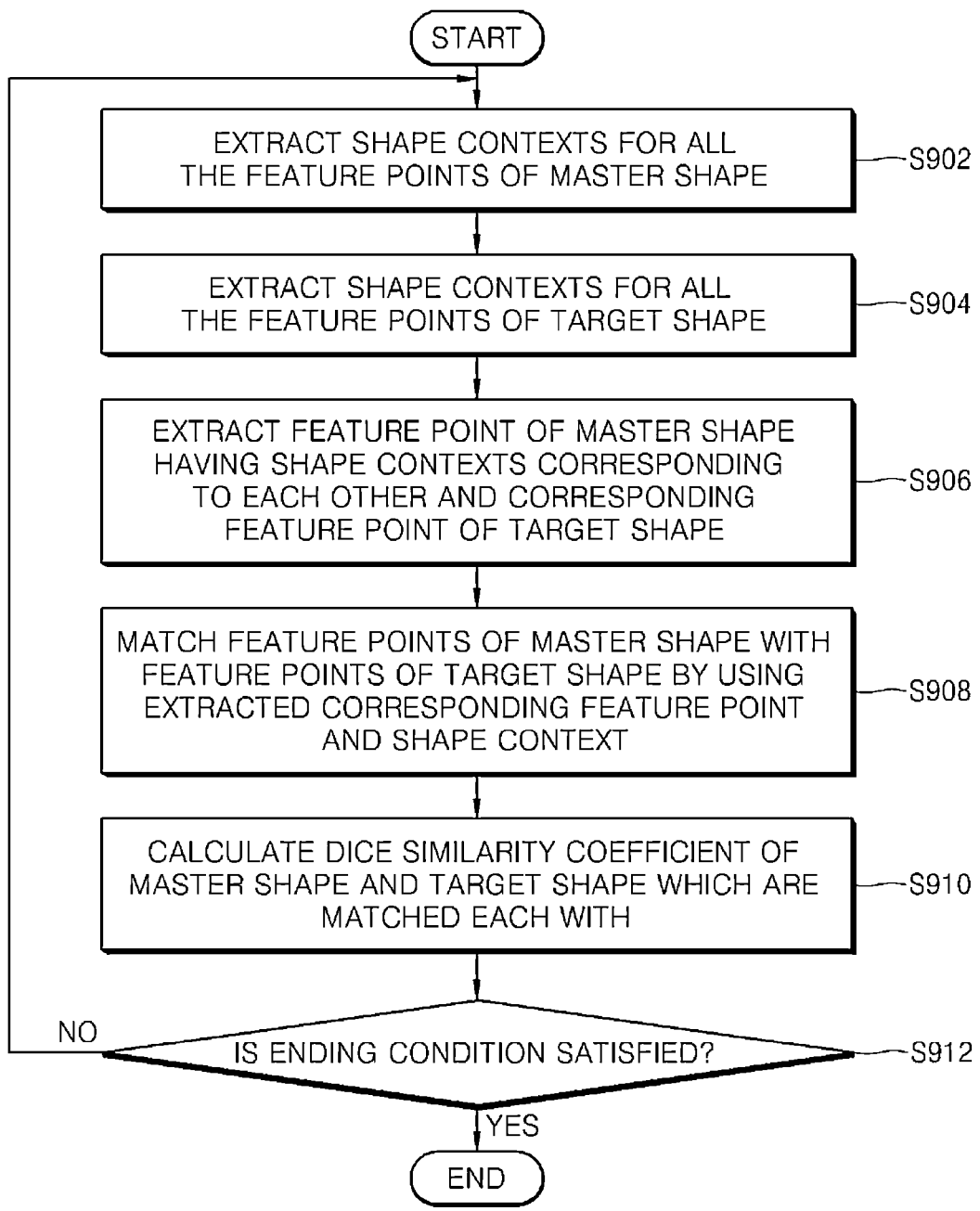
FIG. 9 is a flow chart of iterative shape context matching used in the exemplary embodiment of the present invention.

FIG. 9 is a flow chart of iterative shape context matching used in the exemplary embodiment of the present invention. In the iterative shape context matching, a master shape is matched with a target shape until an ending condition is satisfied. When the ending condition is not satisfied, the master shape is updated and thus is continuously matched with the target shape and the finally matched master shape becomes the matching image.

Referring to FIG. 9, the shape contexts for all the feature points of the master shape are first extracted (S902) and the shape contexts for all the feature points of the target shape are extracted (S904). For reference, a sequence of steps S902 and S904 may be changed.

Next, the feature points of the master shape having the shape contexts corresponding to each other and the corresponding feature points of the target shape are extracted (S906). That is, the feature points (corresponding feature points) of which the distance from each other is minimum are extracted by comparing the shape contexts of each of the feature points of the master shape with the shape contexts of each of the feature points of the target shape. In this case, the point having the minimum distance may be at least two, and therefore a Hungarian method may be used so that the feature points of one target shape per each feature point of the master shape correspond to each other.

After the corresponding feature points are extracted as described above, the feature points of the master shape are matched with the feature points of the target shape by using the extracted corresponding feature points and the shape contexts (S908). Herein, the matching of the master shape with the target shape may be performed by a B-spline registration method.

Next, a dice similarity coefficient of the master shape and target shape which are matched with each other is calculated (S910) and it is determined whether the ending condition is satisfied (S912). When the matched master shape is $S_{m'}$ and the target shape is $S_t$, a dice similarity coefficient $S_{dice}$ is calculated as follows.

$$S_{dice} = \frac{2|S_{m'} \cap S_t|}{|S_{m'}| + |S_t|} \qquad \text{[Equation 2]}$$

When the so calculated dice similarity coefficient satisfies the ending condition, for example, a predetermined value, the matching ends and the matched master shape becomes the matching image. On the other hand, when the ending condition is not satisfied, the process returns to step S902 and thus the matching process is repeated.

Figure 6:
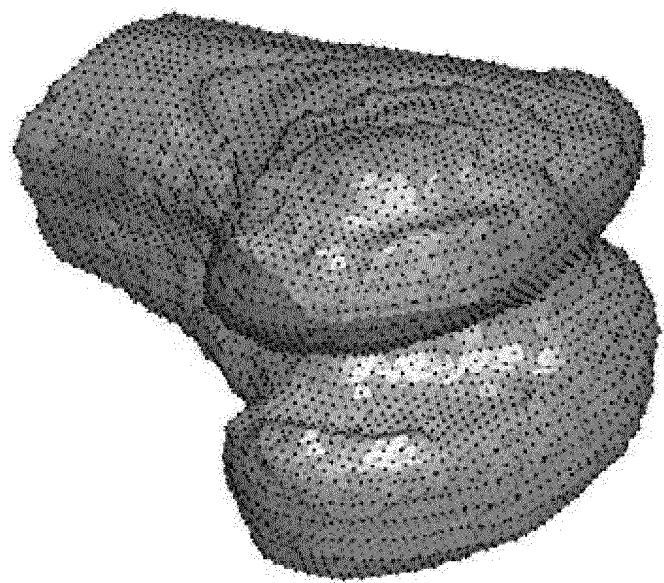
FIG. 6 is a diagram illustrating a reduction image of the matched sample knee bone.

As described above, according to the exemplary embodiment of the present invention, the reduction images are matched with the original images by using the iterative shape context matching, in which the reduction images correspond to the master images and the original images correspond to the target images. The matched knee bone reduction images as illustrated in FIG. 6 may be obtained by iteratively matching the reduction images with the original images. The matched knee bone reduction images illustrated in FIG. 6 have the smaller number of feature points than those of the original images and are matched with the original images and therefore have accuracy approaching the original images.

The generating of the matching image (S302) is performed on all the sample knee bone images. For example, when 60 sample knee bone images are used in the exemplary embodiment of the present invention, the 60 matched sample knee bone reduction images, that is, the matching images will be generated in the generating of the matching image (S302).

(2) Generating of Final Matching Images (S304)

The matching images for each of the sample knee bone images are generated by using the original images and the reduction images of each of the sample knee bone images (S302) and then the final matching images are generated by using the generated matching images (S304).

For example, when the 60 matched sample knee bone reduction images (matching images) are generated in the generating of the matching image (S302), the 60 matching images have different shapes and the different number of feature points. Therefore, the shapes and the number of featuring points of the generated matching images in the generating of the final matching images (S304) coincide with each other.

The generating of the final matching images (S304) is performed similar to the generating of the matching image (S302). First, the reference matching images and the non-reference matching images among the generated matching images are determined. For example, one of the 60 images is selected as the reference matching image and the remaining 59 images is determined as the non-reference matching images.

Next, the feature points of the reference matching images and the feature points of the non-reference images are extracted and the shape contexts for the feature points of the reference matching images and the shape contexts for the feature points of the non-reference matching images are extracted. Further, the non-reference matching images are matched with the reference matching images by using the shape contexts of the extracted reference matching images and the shape contexts of the non-reference matching images, thereby generating the final matching images.

The above-mentioned iterative shape context matching is used during the process of matching the non-reference matching image with the reference matching image. Referring to FIG. 8, the non-reference matching image becomes the master image and the reference matching image becomes the target image. That is, the non-reference matching image is matched with the reference matching image by the iterative shape context matching, such that the shape of the non-reference matching image and the feature point included therein coincide with the reference matching image.

Therefore, the non-reference matching images, that is, the final matching images, which are matched with the reference matching images are generated. The final matching images include the reference matching images and the matched non-reference matching images.

(3) Generating of Feature Point Vectors for Each of the Sample Knee Bone Images (S306)

The final matching images are generated (S304) and then the feature points of the final matching images are extracted, such that the feature point vectors for each of the sample bone knee images are generated (S306). When the number of feature points included in each of the final matching images is set to be n, the feature point vectors are defined as follows.

$$x = (x_1, y_1, z_1, \ldots, x_n, y_n, z_n)^T \qquad \text{[Equation 3]}$$

That is, the feature point vector X is configured of a set of coordinates $x_n$, $y_n$, and $z_n$ of each of the feature points included in the corresponding final matching images.

Therefore, the feature point vectors for each of the sample bone knee images are generated. For example, for the 60 final matching images for the 60 sample bone knee images, the 60 feature point vectors are generated.

(4) Generating of Statistical Shape Model (S308)

After the feature point vectors for each of the sample bone knee images are generated (S306), the statistical shape model is generated by using the average vector and the covariance matrix of the generated feature point vectors (S308). The average vector for each of the feature point vectors xi of n sample bone knee images is calculated depending on the following Equation 4.

$$\bar{x} = \frac{1}{n}\sum_{i=1}^{n} x_i \qquad \text{[Equation 4]}$$

Further, the covariance matrix is calculated depending on the following Equation 5.

$$S = \frac{1}{n-1}\sum_{i=1}^{n}(x_i - \bar{x})(x_i - \bar{x})^T \qquad \text{[Equation 5]}$$

Further, an eigenvector and an eigenvalue of the set of the sample bone knee images may be obtained from the covariance matrix by using a principal component analysis (PCA). The change in the shape of the set of the sample bone knee images may be modeled by using t large eigenvalues corresponding to the eigenvector $\Phi_i$ and may be represented by matrix $\Phi = (\phi_1|\phi_2|\ldots|\phi_t)$. The statistical shape model X may) be represented depending on the following Equation 6 by using the matrix and the average shape.

$$x = \bar{x} + \Phi b \qquad \text{[Equation 6]}$$

In the above Equation 6, b is a t-dimensional vector and a parameter of the statistical shape model and may be represented by $b=\Phi T(x-\bar{x})|$. Each component of the vector b is restricted by an interface (±3σ) which is statistically derived and may approximate the statistical shape model by using the above Equation 6.

Figure 10:
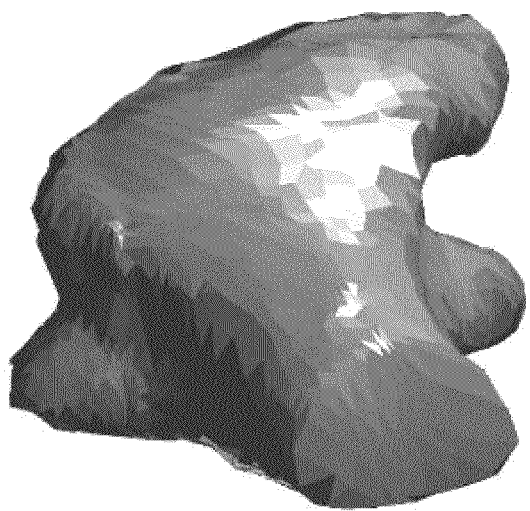
FIGS. 10 to 12 are diagrams illustrating a statistical shape model of a femur generated by using 60 sample knee bone images.
Figure 11:
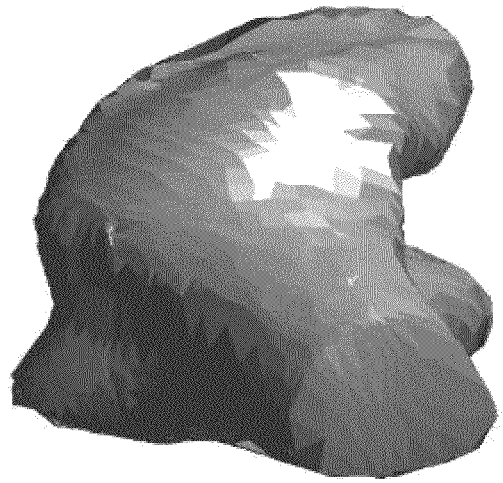
Figure 12:
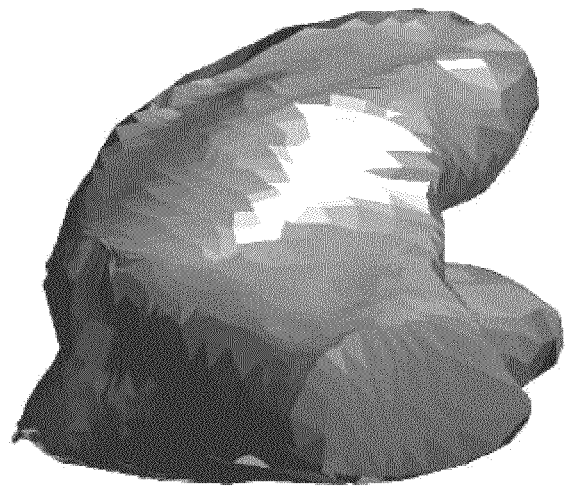

FIGS. 10 to 12 are diagrams illustrating a statistical shape model of a femur generated by using 60 sample knee bone images.

2. Generating of 3D Knee Joint Bone Image (S204)

Referring back to FIG. 3, after the statistical shape model is generated in step S202, the bone region is segmented from the input knee image by using the generated statistical shape model to generate the knee joint bone image (S204).

The statistical shape model includes only the shape information, and therefore may not be directly used for the image segmentation. Therefore, the distribution information on the brightness values around each of the feature points included in the generated statistical shape model is required. First, a normal vector of the feature points of the statistical shape model is obtained and k brightness values are sampled in a normal vector direction from the feature point. Further, the k brightness values are sampled in a direction opposite to the normal vector direction. Next, a brightness value vector of 2k+1 is configured, including the brightness value of the sampled feature point.

By the above method, the brightness value vectors for all the feature points of the generated statistical shape model are extracted. Further, a first order differential value of each of the brightness value vectors is calculated depending on the following Equation 8.

$$g(i)=s(i+2)-s(i) \text{ with } i=1,2,\ldots,2k-1 \quad \text{[Equation 8]}$$

Further, the differential value calculated depending on the following Equation 9 is normalized.

$$g(i) = \frac{1}{l}g(i) \quad \text{[Equation 9]}$$

$$l = \sum_{i=1}^{2k-1} g(i) \quad \text{[Equation 10]}$$

All the feature points of the statistical shape model have the normalized brightness value vector $g_1, g_2, \ldots, g_n$. Herein, the covariance matrix $S_g$ of the corresponding vectors may be obtained and a Mahalanobis distance used to compare with the brightness value vector which is generated when the image segmentation is made using the obtained covariance matrix $S_g$ may be calculated depending on the following Equation 11.

$$f(i)=(g_i-\bar{g})^T S_g^{-1}(g_i-\bar{g}) \quad \text{[Equation 11]}$$

Figure 13:
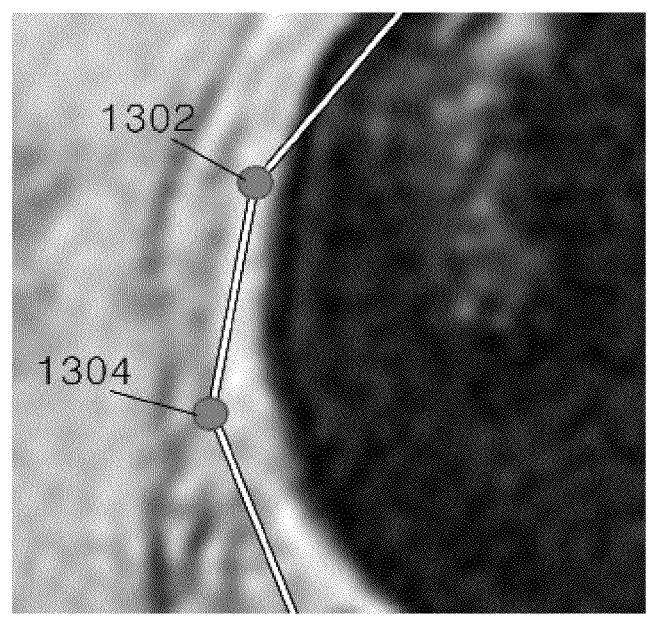
FIGS. 13 to 16 are diagrams for describing a method for generating a knee joint bone image according to the exemplary embodiment of the present invention.

The knee joint bone images are generated as follows by using the generated brightness value vector and covariance matrix. First, as illustrated in FIG. 13, an average shape of the statistical shape model is disposed on the input knee image. For example, the image which is a background of FIG. 13 is the input knee image and feature points 1302 and 1304 and an interface line connecting the feature points are disposed thereon.

Figure 14:
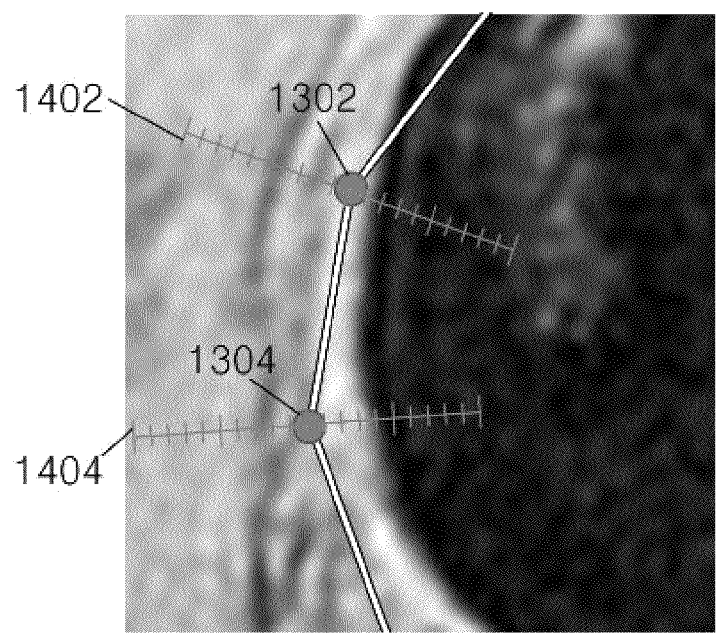
Figure 15:
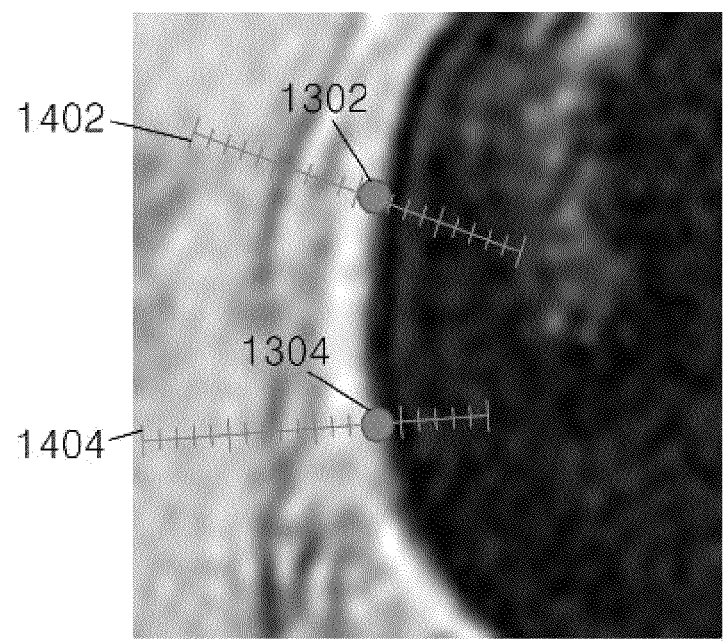

Next, as illustrated in FIG. 14, brightness value vectors 1402 and 1404 where each of the feature points 1302 and 1304 are positioned are calculated. Further, as illustrated in FIG. 15, a point where the Mahalanobis distance between the brightness value vectors obtained at each of the feature points and the previously extracted brightness value vector model is minimized is searched and the feature points 1302 and 1304 moves to the corresponding point.

Figure 16:
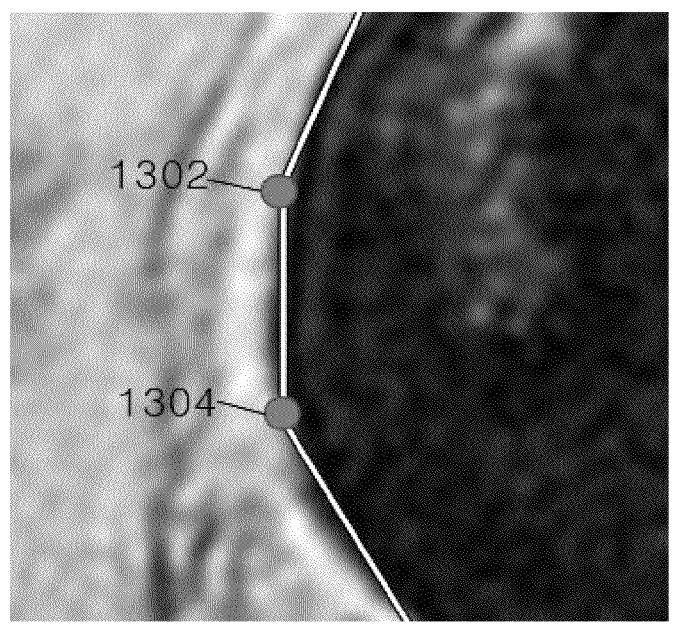

Further, as illustrated in FIG. 16, the knee joint bone images are generated by segmenting the input knee images based on a line connecting the moving feature points 1302 and 1304 as the interface. For example, in FIG. 16, a black portion at the right of the input knee image based on the line connecting the moving feature points 1302 and 1304 as the interface becomes the knee joint bone image.

3. Generating of 3D Knee Joint Cartilage Image (S206)

Referring back to FIG. 2, the cartilage region is segmented from the knee joint bone image generated in step S204 to generate the knee joint cartilage image (S206). The cartilage is always disposed in the specific region by the anatomical feature, for example, in the region within 5 mm from the bone. Therefore, the interest region is set within the 5 mm of the knee joint bone extracted in the previous step and a bone-cartilage interface (BCI) which is a bonded point between the bone and the cartilage is extracted. Further, the cartilage is finally segmented by using the brightness value information of voxel which exists in the normal vector direction of the BCI to generate the knee joint cartilage images. This uses the features that the cartilage has the brightness value higher than that of the bone portion in the MRI image.

4. Generating of 3D Knee Joint Image (S208)

Figure 17:
FIG. 17 is a diagram illustrating the knee joint bone image generated by using an input knee image according to the exemplary embodiment of the present invention.
Figure 18:
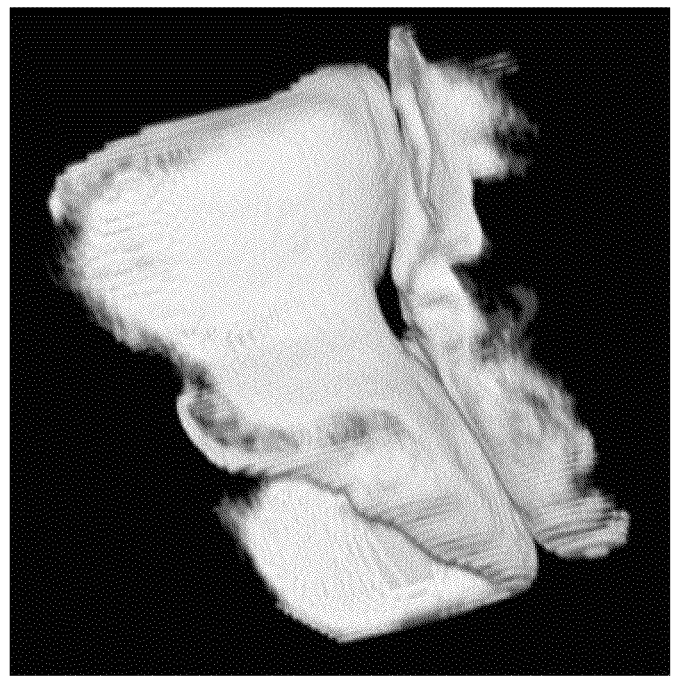
FIG. 18 is a diagram illustrating a knee cartilage image generated by using the input knee image according to the exemplary embodiment of the present invention.
Figure 19:
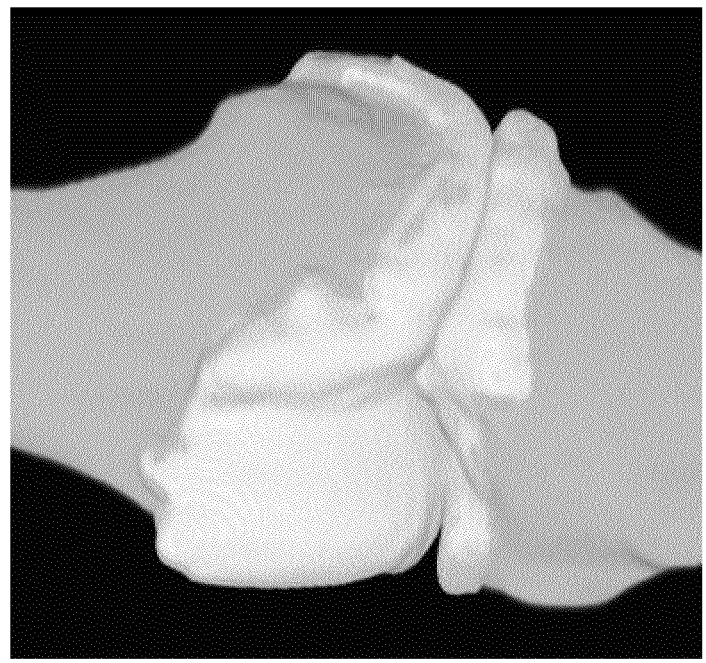
FIG. 19 is a diagram illustrating the 3D knee joint image generated by composing the knee joint bone image with the knee joint cartilage image.

Referring back to FIG. 2, the 3D knee joint image for the input knee image is generated b composing the knee joint bone image and the knee joint cartilage image which are generated in steps S204 and S206. FIG. 17 is a diagram illustrating the knee joint bone image generated by using an input knee image according to the exemplary embodiment of the present invention, FIG. 18 is a diagram illustrating a knee cartilage image generated by using the input knee image according to the exemplary embodiment of the present invention, and FIG. 19 is a diagram illustrating the 3D knee joint image generated by composing the knee joint bone image with the knee joint cartilage image.

To test the accuracy of the 3D knee joint image generated by the present invention, comparison results with the 3D knee joint image manually generated by an expert are as follows.

TABLE 1

|  | AvgD (mm) | RMSD (mm) |
| --- | --- | --- |
| Femur | 1.17 ± 0.25 | 1.63 ± 0.32 |
| Tibia | 1.89 ± 1.33 | 2.70 ± 1.70 |
|  | VOE (%) | VD (%) |
| Articular cartilage | 32.3 ± 3.3 | −15.1 ± 8.7 |
| Meniscus cartilage | 39.0 ± 3.8 | −13.8 ± 11.4 |

To verify the segmented data, for the bone region, an average symmetric surface distance (AvgD) and a root mean square symmetric surface distance (RMSD) were measured and for the cartilage region, a volumetric overlap error (VOE) and a relative volume difference (VD) were measured.

All the numerical values shown in Table 1 show that the 3D knee joint images generated by the present invention have little difference from the 3D knee joint image manually generated by an expert.

Consequently, according to the exemplary embodiment of the present invention, the 3D knee joint images may be more rapidly and conveniently generated without showing the large difference from the 3D knee joint images manually generated by an expert.

As set forth above, according to the exemplary embodiments of the present invention, it is possible to more rapidly and accurately generate the 3D knee joint image.

The present invention will be apparent to those skilled in the art that substitutions, modifications and variations can be made without departing from the spirit and scope of the invention and therefore, is not limited to the aforementioned embodiments and the accompanying drawings.

What is claimed is:

1. A method for generating a 3D knee joint image, comprising:
   generating a statistical shape model by using previously generated sample knee bone images;
   generating a knee joint bone image by segmenting a bone region from an input knee image using the statistical shape model;
   generating a knee joint cartilage image by segmenting a cartilage region from the knee joint bone image; and
   generating a 3D knee joint image for the input knee image by composing the knee joint bone image with the knee joint cartilage image,
   wherein the generating of the statistical shape model includes:
      generating matching images for each of the sample knee bone images by using original images and reduction images of each of the sample knee bone images;
      generating final matching images by using the matching images;
      generating feature point vectors for each of the sample bone knee images by extracting feature points of the final matching images; and
      generating the statistical shape model by using an average vector and a covariance matrix of the feature point vectors.

2. The method of claim 1, wherein the generating of the matching images includes:
   extracting feature points of the original images and feature points of the reduction images;
   extracting shape contexts for the feature points of the original images and shape contexts for the feature points of the reduction images; and
   generating the matching images by matching the reduction images with the original images using the shape contexts of the original images and the shape contexts of the reduction images.

3. The method of claim 1, wherein the generating of the final matching images includes:
   determining a reference matching image and a non-reference matching image among the matching images;
   extracting feature points of the reference matching image and feature points of the non-reference image;
   extracting shape contexts for the feature points of the reference matching image and shape contexts for the feature points of the non-reference matching image; and
   generating the final matching images by matching the non-reference matching image with the reference matching image using the shape contexts of the reference matching image and the shape contexts of the non-reference matching image.

4. A method for generating a 3D knee joint image, comprising:
   generating a statistical shape model by using previously generated sample knee bone images;
   generating a knee joint bone image by segmenting a bone region from an input knee image using the statistical shape model;
   generating a knee joint cartilage image by segmenting a cartilage region from the knee joint bone image; and
   generating a 3D knee joint image for the input knee image by composing the knee joint bone image with the knee joint cartilage image,
   wherein the generating of the knee joint bone image includes:
      disposing the statistical shape model on the input knee image;
      calculating a brightness value vector of a point, at which each of the feature points of the statistical shape model is positioned, in the input knee image;
      moving each of the feature points by using the brightness value vector; and
      segmenting a bone region from the input knee image by using each of the moving feature points.

5. A method for generating a 3D knee joint image, comprising:
   generating a statistical shape model by using previously generated sample knee bone images;
   generating a knee joint bone image by segmenting a bone region from an input knee image using the statistical shape model;
   generating a knee joint cartilage image by segmenting a cartilage region from the knee joint bone image; and
   generating a 3D knee joint image for the input knee image by composing the knee joint bone image with the knee joint cartilage image,
      wherein the generating of the knee joint cartilage image includes:
      setting an interest region in the knee joint bone image;
      extracting a bone-cartilage interface from the interest region; and
      segmenting a cartilage region from the knee joint bone image by using brightness value information of the bone-cartilage interface.

* * * * *